Feb. 16, 1937.   R. D. SHAW   2,071,180
ELECTRICALLY CONTROLLED AND OPERATED LATHE
Filed Dec. 17, 1935   3 Sheets-Sheet 1
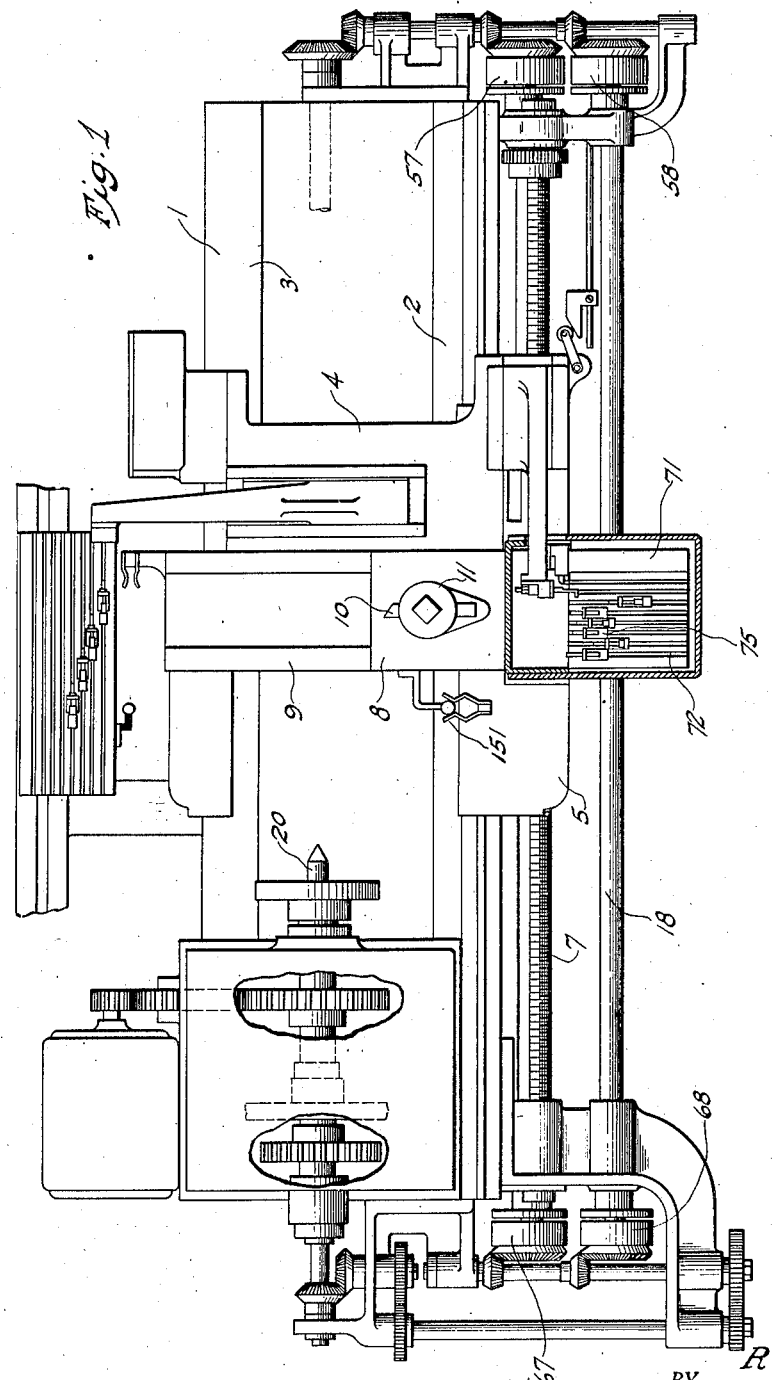
INVENTOR.
Robert D. Shaw
BY Joseph K. Schofield
ATTORNEY

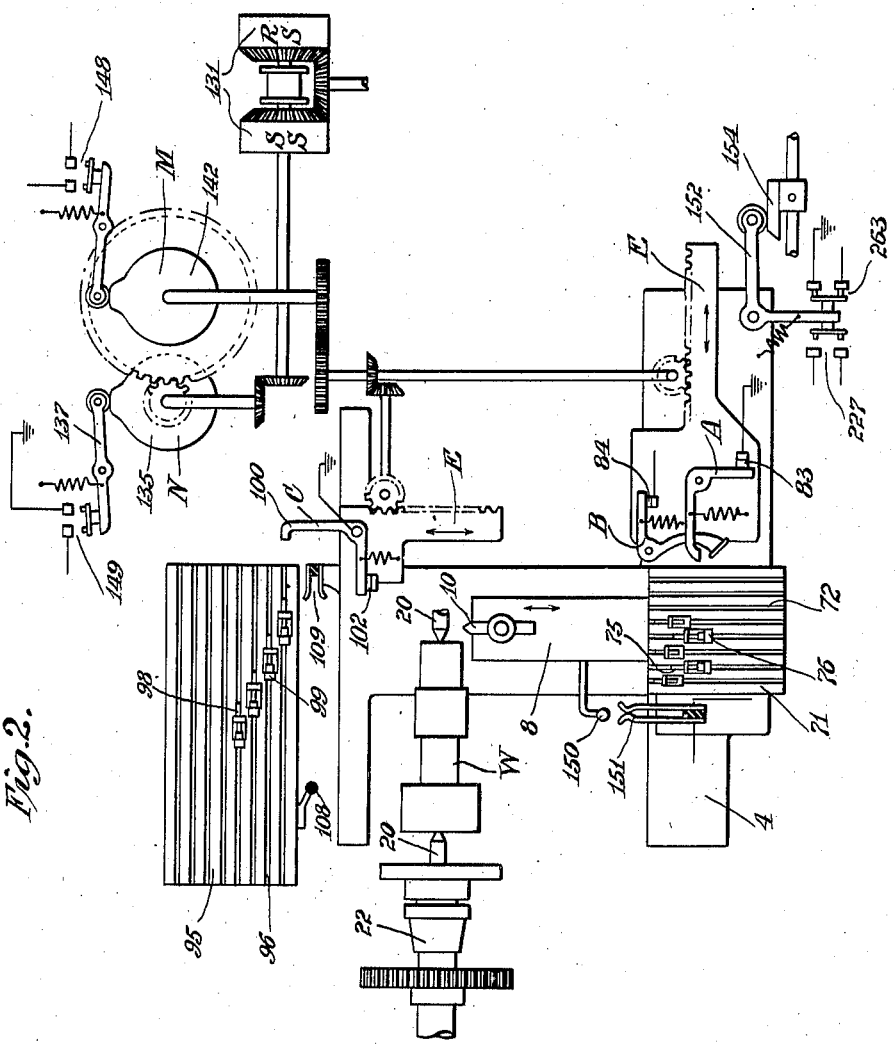

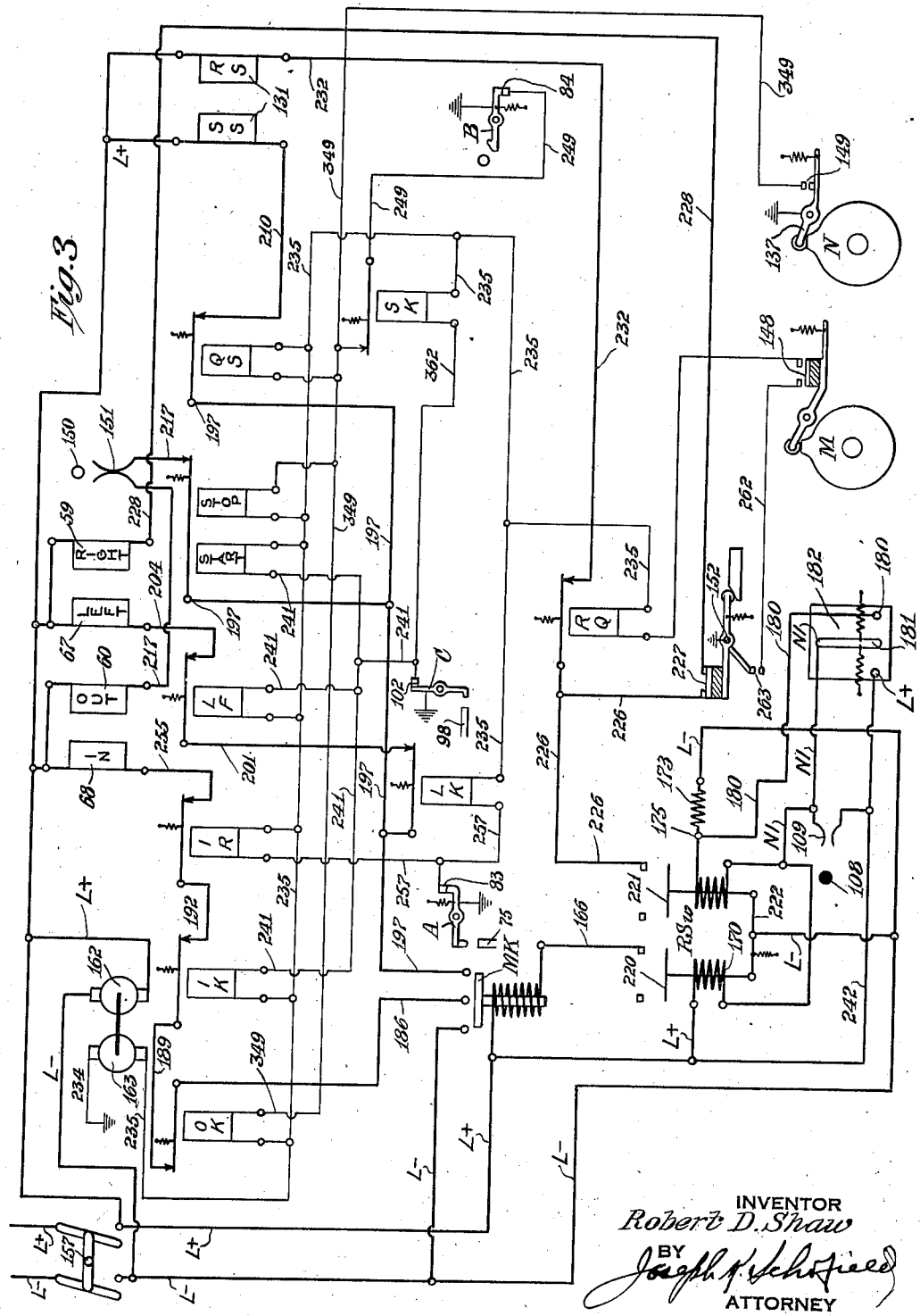

Patented Feb. 16, 1937

2,071,180

UNITED STATES PATENT OFFICE 2,071,180

ELECTRICALLY CONTROLLED AND OPERATED LATHE

Robert D. Shaw, Hartford, Conn., assignor, by mesne assignments, to Niles-Bement-Pond Company, New York, N. Y., a corporation of New Jersey Application December 17, 1935, Serial No. 54,869

5 Claims. (Cl. 82—21)

This invention relates to electrically controlled and operated rotatable work support and longitudinally and transversely movable tool supports.

More particularly the invention relates to metal turning lathes having magnetic clutches for effecting transverse and longitudinal feed movements of the tool supports relative to the work, the movements being automatically controlled for cutting portions along the work piece of greater or less diameters.

The longitudinal and transverse feeding movements of the tool relative to the work for cutting different diameters along the work are arranged to be controlled automatically by the operation of suitable switches and contactors adapted to open and close control circuits.

This application forms an improvement upon and a continuation in part of my copending application Serial No. 730,894 filed June 16, 1934, now Letters Patent No. 2,032,598 granted March 3, 1936.

While the arrangement of circuits, relays, control switches and contactors shown and described herein may be utilized in connection with various types of machine tools, the arrangement is more particularly adapted for the automatic control of a metal turning lathe arranged for turning or cutting portions of a work piece of different diameters, either greater or less than adjacent portions, longitudinally along the work. As usual the tool is mounted for transverse feed movements upon a cross slide and for longitudinal movements of the tool the cross slide is mounted upon a longitudinally movable carriage. The cross slide and carriage are arranged to be moved by magnetic clutches and provision is made for alternate transverse and longitudinal movements of the slide and carriage as in the copending application.

For turning portions of different diameters, automatic control of the relative movements of the tool is preferably arranged so that the circuits for energizing the respective magnetic clutches for moving the carriage and slide are controlled by contactors operated by these members. In the present case the contactors controlling the position of the cross slide may be positioned for any diameter of work at any step or portion along the work piece. By this means successive portions longitudinally of the work may be of either greater or less diameter relative to other adjacent portions. Portions longitudinally of the work are not required to be of successively greater diameter in one direction as in my patent referred to above.

The primary object, therefore, of the invention is to improve the electrical connections and control for the above referred to tool moving supports enabling the successive and alternate transverse and longitudinal feeding movements of the tool relative to the work to be of any diameter and length, the transverse and longitudinal movements being widely adjustable for cutting each step of any length and any diameter regardless of the diameter or length of an adjacent portion on either side.

With the above and other objects in view, my invention includes the features of construction and operation set forth in the following specification and illustrated in the accompanying drawings.

In the drawings:

Figure 1 is a plan view showing the essential parts of a complete lathe provided with the present invention.

Fig. 2 is a diagrammatic view showing a plan of the movable parts of a lathe made according to the present invention; and Fig. 3 is a wiring diagram of the controlling and operating electric circuits of the lathe.

As the mechanical parts of the present invention are in every way similar to those shown in my above referred to application they will not be illustrated in detail. Reference may be made to the copending application for more complete illustration of these operating parts. Fig. 1 indicates the general construction and with Fig. 2 shows the operation of the cross slide and carriage as well as the action of the contactors, switches, etc., of the circuits shown in Fig. 3. For a complete description of the electric circuits, reference may be made to the above referred to patent.

In the accompanying drawings annexed hereto and forming a part of this specification, I have indicated my invention as being applied to a metal turning lathe particularly adapted for multi-diameter shaft turning, but it will be understood that the invention can be otherwise embodied and that the drawings are not to be construed as defining or limiting the scope of the invention, the claims appended to this specification being relied upon for the purpose. It is to be understood also that changes and modifications may be made within the scope of the appended claims without departing from the spirit of the invention.

Referring more in detail to the drawings and to the following description, it will be observed that the present improvement is arranged to automatically control the movements of a tool slide and carriage having a single cutting tool adapted for turning successive steps of greater or less diameter on a work piece. A lathe of the usual or any preferred construction is provided with a frame or bed 1 formed with longitudinally extending ways 2 and 3 along which the longitudinally movable carriage 4 may slide. This longitudinally movable carriage 4 has a depending front apron 5 in which is mounted the usual nut for cooperation with lead screw 7. Rotation of screw 7 effects longitudinal movements of the tool 10 along the work by movement of the carriage 4 to the right or to the left according to the direction of rotation of the screw.

For transverse movements of the tool 10 toward and from the work axis a cross slide 8 is mounted upon transverse ways 9 formed on the longitudinally movable carriage 4. The lathe tool 10 is mounted in the usual manner upon tool post 11, on the cross slide 8, the tool being arranged to cooperate with the work W, supported and rotated by the lathe spindle in the usual manner. The transverse movements of the tool 10 toward and from the work axis may be effected by suitable connections from cross slide 8 to a spline shaft 18, extending longitudinally of the machine and parallel to lead screw 7.

Rotation of lead screw 7 for longitudinal movements, and of spline shaft 18 for transverse movement of the tool 10 can be effected in any preferred manner, and the usual change gear mechanisms and devices for varying the relative speeds of the forward and return movements of the tool may be employed as described in the above mentioned patent.

In the above referred to patent, which may be referred to as a step shaft lathe, it was impossible to turn forms other than those having cylindrical portions of successively increasing diameters along the work. Each step was cylindrical in form and of any length but had to be of an increased diameter as each successive step approached the headstock.

It has been found desirable, however, to provide an improved arrangement of the electric controlling circuits, contactors and connections so that any step or portion of the work can be turned down to any diameter. That is, successive steps longitudinally of the work may be either greater or less in diameter than an adjacent step on either side. The electric circuits necessary to accomplish this improvement enabling successive steps to be of greater or less diameter than adjacent steps are shown in the diagram (Fig. 3). The complete wiring diagram is shown for both longitudinal and transverse movements of the tool 10 similar to the diagram shown in Fig. 8 of my patent.

Preferably, the lathe tool 10 when starting from its initial outer and right hand position is first moved inward by an electromagnet 68 to position the tool at the proper distance from the axis of the work for the first diameter to be turned. Longitudinal movement of carriage 4 by energizing electromagnet 67 then takes place to move the tool 10 toward the left for cutting the first step. At the completion of this step the tool 10 is withdrawn radially from the work by energizing magnet 58 and is then again moved inwardly by electromagnet 68 to the proper depth for the second step or diameter (which may be of any dimension) while longitudinal movement is stopped. This sequence of movements of the tool 10 longitudinally and transversely or radially is repeated for as many portions of different diameters as may be required. When the last longitudinal movement of the tool 10 has been completed in the feeding direction to form the final step or diameter, the outward movement of the tool radially will be such as to completely clear the work. This outward movement of the tool 10 and its slide 8 is stopped as soon as insulated projection 150 engages and opens contacts 151. The carriage 4 again moves forward or to the left a slight distance until the metal projection 108 bridges the space between contacts 109. This closes a circuit which initiates the movement of carriage 4 to the right by electromagnet 57 to return the tool to its initial position. This return movement of the tool completes a cycle of operation and the machine stops as soon as arm 152 engages cam 154 in position for another cycle of operations.

For controlling the movements of the tool 10 by movements of the carriage 4 and slide 8 and to effect the cycle of movements as above outlined, contactors and actuators therefor, similar to those shown and described in the above referred to application, are arranged to be operated respectively by the transverse and longitudinal movements of the tool. These members are shown with their controlling circuits in the diagram, Fig. 2. Accordingly, there is mounted upon the cross slide 8 a forward extension 71 provided with a plurality of T-slots 72 extending transversely of the bed and parallel with the cross slide ways 9. Adjustable stops 75 are mounted in these slots and successively engage and open contactors B and C. Also there is provided on the bed an extension 95 having slots 96 in which stops 98 are adjustably mounted in directions longitudinally of the work. These stops 98 successively engage and open contactor C.

The operation of the various contactors, the movements of slides D and E carrying contactors A, B and C, and the rotation of cams M and N by means of which the slides D and E are moved to their successive positions will be clear upon inspection of the diagrammatic view of these members shown in Fig. 3. Each of these operations is similar in every way to the corresponding operation in my above referred to patent to which reference may be made for a detailed description. The circuits, however, have been materially changed as compared with those described in the above referred to patent in order that transverse movements of the tool 10 may not be limited by previous transverse movements of the tool. These changes will now be described in detail.

Referring to the control circuits shown in Fig. 3, it will be seen that the wire 235 connects one side of the generator 163 to one side of the magnet coils of the relays OK, IK, IR, LF, Start, Stop, QS, SK, RQ and LK. These relays control the magnet clutches 67 and 59 for effecting the left and right movements of the tool carriage 4, clutches 68 and 60 for controlling the transversely movable tool slide 8, and the clutches 131 for operating the sequence set cams M and N (142 and 135). To operate any one of these relays, therefore, it is necessary only to connect the opposite pole of a relay to some part of the machine which is grounded as well as the generator 163.

The A contactor through the wire 251 completes the circuits to relays LK and IR. As long as this contactor A is closed the relay IR is closed and relay LK is opened. When the contactor A is opened by engagement with an actuator 75 relay IR is opened by its spring and relay LK is closed by its spring.

In the original machine shown in my above referred to patent, to permit running the tool inward for the first diameter the relay SK was held open through contacts 263 of the Right limit switch 152. This permitted the tool 10 to run inward without starting the sequence set mechanism SS through contactor B which was closed. In the present wiring diagram, however, this relay SK is held closed through the longitudinal contactor C, wire 362 connecting contactor C directly with relay SK. The part of connection wire 249 shown in the diagram in my above referred to patent leading from the contacts 84 on the B contactor to the contacts operated by the cam N is removed, and these contacts 84 are connected directly to the wire 249 at the armature of the relay SK. From beyond the armature of relay SK a connection 349 extends to contacts 149 operated by the N cam. The connection from the armature of the SK relay to the stop side of the start-stop relay wire 249 is also removed. This stop side of the start-stop relay connects directly to the wire 249 beyond the armature of the SK relay. The remaining circuits are in every way similar to those made use of in my above referred to patent. For convenience the numerals shown in Fig. 3 correspond to the numerals used in the diagram of the above referred to patent.

In operation of the present form of the invention the changed connections make it unnecessary to open the out contactor B in order to stop the sequence set. The sequence set is started in the same way through the contactor B but is not dependent upon this contactor for stopping, the stopping being accomplished only by the N cam by opening contacts 149. As soon, however, as the C contactor is opened by striking one of the longitudinal stops 98, the relay SK is immediately permitted to close by its spring. This connects the contactor B, in event of its being closed, to the sequence set relay QS. The sequence set slides D and E then move to a new position as in the above referred to patent. While these slides D and E are moving to their new position the contactor C is, of course, closed. Consequently, SK relay is opened, thereby eliminating the B contactor from effecting the stopping of the sequence set. This stopping of the sequence set is accomplished entirely by rotation of the N cam and by the opening of contacts 149.

All the circuits of the present case controlling the initial inward movement of the tool slide 8, the successive movements to the left of the carriage 4, and the final or return movement of the carriage 4 to its initial position correspond to those described in the above referred to patent. This application differs from the earlier case only in the operation of the tool slide 8, particularly in the control for its inward motion to form the portions of different diameters after the first longitudinal portion of the work has been turned. By means of the above-described circuits any inward movement of the tool slide 8 may take place to any desired diameter or position rather than to increasing diameters at each successive stop. Each inward movement of the slide 8 is limited only by the position of the actuator 75, the in motion continuing at each step until stopped by one of the actuators 75.

There is no functional difference between the present invention and the structure described in the above-referred to patent until after cross slide 8 has moved inward and has been stopped by the opening of the A contactor for the first step. Longitudinal or cutting movement of slide 4 then takes place as described in the above referred to patent. The carriage 4 after having been started moving by this opening of the A contactor continues its motion to the left until stopped by the opening of the C contactor. The opening of this C contactor, as in the above-referred to patent starts the outward movement of the slide 8 if the B contactor is open. This outward movement continues until the slide 8 is stopped by the closing of the B contactor when this contactor slides off the end of the adjacent stop 75. If, however, the adjacent stop is adjusted for a smaller diameter than the first step, the B contactor is closed and does not open. Then as soon as the opening of the C contactor occurs the sequence set slide is permitted to move over at once to its new position, this movement being determined entirely by the N cam and the contacts 149.

In my patent referred to above, if the second or any subsequent stop 75 were set for a diameter smaller than a preceding step, after the carriage 4 had been stopped by the C contactor the sequence set mechanism would move successively from one position to the next until its final position was reached. During these successive resetting movements of the sequence set mechanism no longitudinal movement of the slide 4 takes place. By means of the improved wiring connections each of the stops 75 may be adjusted for any diameter independently of the position of any other stop and these stops or actuators for the A contactor or switch independently of any other mechanism govern the in movements of the tool.

What I claim is:

1. In a metal cutting machine, the combination of rotating means for the work, a movable support for the tool, magnetic clutches for effecting relative movements of said tool support longitudinally and transversely in and out relative to the work, switches controlling said circuits, a plurality of variably positionable switch actuators arranged to successively operate the switches by relative movements of said tool support for limiting the movements thereof, and circuits for energizing said magnetic clutches and operated by movements of said support for effecting said transverse movements in or out at predetermined positions along the work independently of the position of adjacent actuators.

2. In a metal cutting machine, the combination of rotating means for the work, a movable support for the tool, magnetic clutches for effecting relative longitudinal and in and out transverse movements of said tool support, circuits for operating the respective magnetic clutches, relays controlling operation of the clutch circuits, switches controlling circuits for operating said relays, switch actuators controlled by movement of said support for determining the sequence of operation of said switches for controlling said movements longitudinally and transversely in or out so as to cut the work in prearranged portions of different diameters.

3. In a metal cutting lathe, the combination of rotating means for the work, a support for moving the tool relative to the work, magnetic clutches for effecting movements of said tool support longitudinally and transversely in and out relative to the work, circuits for operating the respective magnetic clutches to effect said movements, relays for controlling the clutch circuits, circuits for operating said relays, and switches controlled by actuators adjustably positioned on said supports for operating said relays and effecting the feed movements transversely in or out and longitudinally in prearranged steps, each actuator controlling the transverse position of said support independently of the position of an adjacent actuator.

4. In a metal cutting lathe, the combination of rotating means for the work, a support for moving the tool longitudinally and transversely in and out relative to the work, magnetic clutches for effecting movements of said support, circuits for energizing the magnetic clutches, relays for controlling the respective clutch circuits, switches controlling operation of said relays for effecting relative movements of said supports transversely in or out and longitudinally to any predetermined successive positions, and means controlling operation of said switches so that the respective movements follow a cycle from an initial position back to initial position while cutting a plurality of different diameters on the work.

5. In a metal cutting lathe, the combination of rotating means for the work, a support for moving the tool longitudinally and transversely of the work, magnetic clutches for effecting relative movements of said support, circuits for operating said magnetic clutches, relays controlling operation of said clutch circuits, switches successively moved to new positions after successive longitudinal movements of said tool, circuits operated thereby for operating said relays in prearranged sequence, adjustable actuators for operating one of said switches in its successive positions for controlling transverse in or out movements of the tool, adjustable actuators for operating other of said switches for controlling longitudinal movements of the tool, and means controlled by movements of said support to each longitudinal position for the relative positioning of the actuators and switches so that the respective switches may be actuated in predetermined sequence.

ROBERT D. SHAW.